United States Patent
Reuter et al.

(10) Patent No.: US 10,596,873 B2
(45) Date of Patent: Mar. 24, 2020

(54) VEHICLE SUSPENSION CONTROL SYSTEM AND METHOD OF OPERATION THEREOF

(71) Applicant: BEIJINGWEST INDUSTRIES CO., LTD., Beijing (CN)

(72) Inventors: David Fredrick Reuter, Beavercreek, OH (US); Daniel Norbert Borgemenke, Springboro, OH (US); Bryan P. Riddiford, Dayton, OH (US)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 216 days.

(21) Appl. No.: 15/862,444

(22) Filed: Jan. 4, 2018

(65) Prior Publication Data

US 2018/0222275 A1 Aug. 9, 2018

Related U.S. Application Data

(60) Provisional application No. 62/456,701, filed on Feb. 9, 2017.

(51) Int. Cl.
 *B60G 17/052* (2006.01)
 *B60G 17/056* (2006.01)
 (Continued)

(52) U.S. Cl.
 CPC ....... *B60G 17/0528* (2013.01); *B60G 17/019* (2013.01); *B60G 17/0155* (2013.01);
 (Continued)

(58) Field of Classification Search
 CPC ............ B60G 17/0528; B60G 17/0155; B60G 17/0523; B60G 17/019; B60G 17/056
 See application file for complete search history.

(56) References Cited

U.S. PATENT DOCUMENTS

| | | |
|---|---|---|
| 4,799,707 A | 1/1989 | Buma et al. |
| 5,048,867 A | 9/1991 | Gradert |

(Continued)

FOREIGN PATENT DOCUMENTS

| | | |
|---|---|---|
| DE | 102014012646 | 2/2016 |
| EP | 0400301 | 12/1990 |

(Continued)

OTHER PUBLICATIONS

Extended European Search Report dated Jul. 25, 2018, for counterpart European patent application No. EP18155048.4.

(Continued)

*Primary Examiner* — Faye M Fleming
(74) *Attorney, Agent, or Firm* — William H. Honaker; Dickinson Wright PLLC

(57) ABSTRACT

An air management system and method are provided. The system includes a pressurized air source. A manifold block is coupled to the pressurized air source and includes a plurality of suspension valves in fluid communication with the pressurized air source and each defines a suspension orifice of a first diameter for controlling air flow to and from a plurality of air springs. A manifold pressurization valve is in fluid communication with the plurality of suspension valves and the pressurized air source and defines a manifold pressurization orifice of a second diameter that is less than the first diameter of the suspension orifice for opening under high pressure to allow pressurized air into the manifold block. An electronic control unit controls the manifold pressurization valve and the plurality of suspension valves to equalize a high pressure differential across the plurality of suspension valves from the plurality of air springs.

20 Claims, 15 Drawing Sheets

(51) Int. Cl.
  *B60G 17/015* (2006.01)
  *B60G 17/019* (2006.01)

(52) U.S. Cl.
  CPC ....... *B60G 17/056* (2013.01); *B60G 17/0523* (2013.01); *B60G 2202/152* (2013.01); *B60G 2500/02* (2013.01); *B60G 2500/203* (2013.01); *B60G 2500/204* (2013.01); *B60G 2500/2021* (2013.01); *B60G 2500/302* (2013.01)

(56) References Cited

U.S. PATENT DOCUMENTS

| | | | |
|---|---|---|---|
| 5,049,867 A | | 9/1991 | Stouffer |
| 6,276,761 B1 * | | 8/2001 | Beck ..................... B60T 11/326 303/127 |
| 6,726,189 B2 | | 4/2004 | Folchert et al. |
| 7,568,713 B2 | | 8/2009 | Hecker et al. |
| 9,010,785 B2 * | | 4/2015 | Gocz .................. B60G 17/0523 280/124.16 |
| 9,199,524 B2 * | | 12/2015 | Stabenow .......... B60G 17/0525 |
| 10,017,025 B2 * | | 7/2018 | Reuter ................. B60G 17/056 |
| 2012/0097282 A1 | | 4/2012 | Coombs et al. |
| 2013/0257007 A1 | | 10/2013 | Frank et al. |
| 2013/0318954 A1 | | 12/2013 | Frank et al. |
| 2014/0312590 A1 | | 10/2014 | Stabenow |
| 2014/0333038 A1 | | 11/2014 | Gocz et al. |

FOREIGN PATENT DOCUMENTS

| | | |
|---|---|---|
| WO | 2008147850 | 12/2008 |
| WO | 2012079680 | 6/2012 |
| WO | 2013143566 | 10/2013 |

OTHER PUBLICATIONS

First Office Action dated Jun. 25, 2019 for counterpart European patent application No. EP18155048.4.

First Office Action and Search Report dated May 29, 2019 for counterpart Chinese patent application No. 201810053324.X, along with machine EN translation downloaded from EPO.

Second Office Action dated Oct. 12,2019 for counterpart Chinese patent application No. 201810053324.X, along with machine EN translation.

* cited by examiner

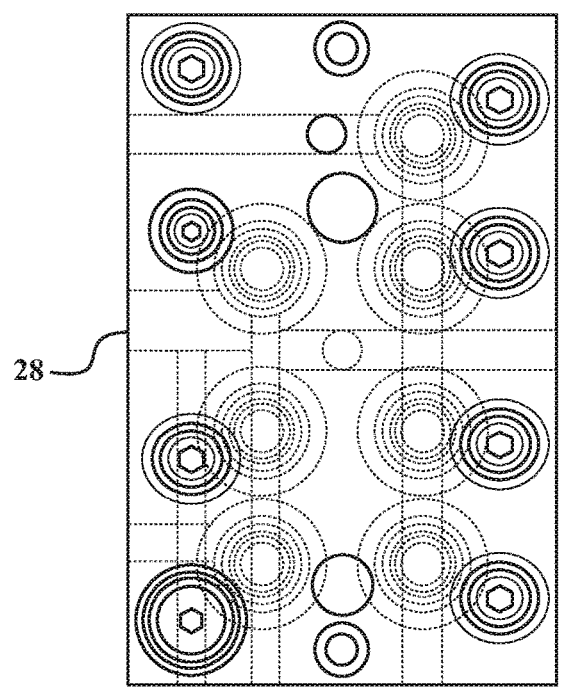 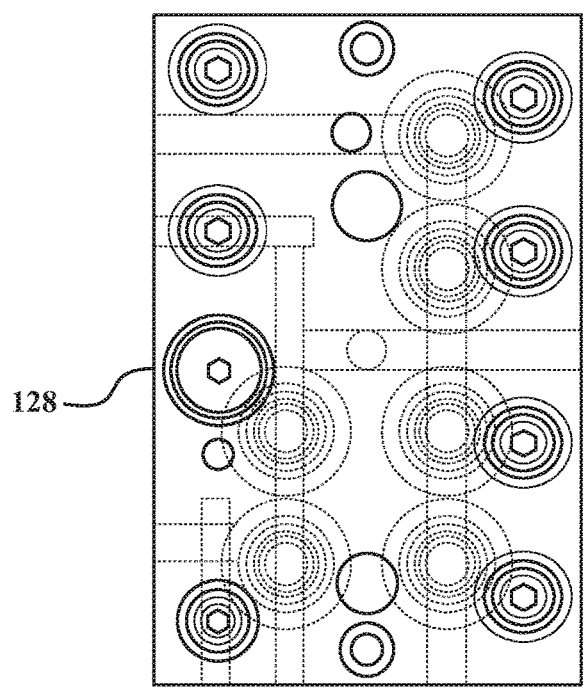
FIG. 15A　　　　FIG. 15B

VEHICLE SUSPENSION CONTROL SYSTEM AND METHOD OF OPERATION THEREOF

CROSS-REFERENCE TO RELATED APPLICATIONS

This utility application claims the benefit of U.S. Provisional Application No. 62/456,701 filed Feb. 9, 2017. The entire disclosure of the above application is incorporated herein by reference.

FIELD

An air management system for controlling an air suspension assembly of an automotive vehicle. More specifically, an air suspension control system including a plurality of suspension valves defining large suspension orifices and a method of operating the air management system to exhaust the air suspension assembly.

BACKGROUND

Air suspension assemblies are known in the art for use on automotive vehicles. Such air suspension assemblies typically include a plurality of air springs, each for interconnecting the body and one of the wheels of the automotive vehicle for damping relative forces between the body and the wheels, and for adjusting the height of the automotive vehicle.

In order to control such air suspension assemblies, air management systems are commonly utilized. The air springs are commonly connected via one or more air lines to a manifold block of the air management system. The air management system may also include a compressor or pump including a motor that may be coupled to the manifold block to provide air to fill the air springs. When exhausting air from the air springs after they have been inflated, it is desirable to provide for a high flow rate.

Consequently, it is common to utilize additional valves connected in parallel, for example, with the valves coupled to the air springs to provide for additional air flow when exhausting the system. However, such additional valves increase the cost, weight, and complexity of the air management system. Additionally, valves designed to operate under high pressure typically have an increased cost, size, and mass due to large coils that are needed to provide a magnetic force to open and close the valve under pressure (e.g., when the air springs are pressurized). Thus, there remains a need for improvements to such air management systems and methods of operating the air management system to provide for desired exhaust flow rates while remaining compact and low cost.

SUMMARY

An air management system for controlling an air suspension assembly of an automotive vehicle is provided. The air management system includes a pressurized air source. A manifold block is coupled to the pressurized air source and includes a plurality of suspension valves in fluid communication with the pressurized air source and each of the plurality of suspension valves defines a suspension orifice of a first diameter for controlling air flow to and from a plurality of air springs. The manifold block also includes a manifold pressurization valve in fluid communication with the plurality of suspension valves and the pressurized air source and defines a manifold pressurization orifice of a second diameter that is less than the first diameter of the suspension orifice for opening under high pressure to allow the pressurized air from the pressurized air source into the manifold block. An electronic control unit is electrically coupled to the plurality of suspension valves and the manifold pressurization valve for controlling a sequence of operating the manifold pressurization valve and the plurality of suspension valves to equalize a high pressure differential across the plurality of suspension valves from the plurality of air springs.

A method of operating an air management system is also provided. The method includes the step of providing pressurized air from a pressurized air source. The method continues by opening a manifold pressurization valve coupled to the pressurized air source and immediately closing the manifold pressurization valve. Next, pressurizing a manifold block with the pressurized air from the pressurized air source through the manifold pressurization valve. Then, the method includes the step of equalizing a high pressure differential across a plurality of suspension valves in the manifold block. The method proceeds by opening the plurality of suspension valves. The method concludes with the step of exhausting air through the plurality of suspension valves from a plurality of air springs coupled to the plurality of suspension valves.

Another method of operating an air management system to control an air suspension assembly of an automotive vehicle is additionally provided. The method includes the steps of providing pressurized air from a pressurized air source and opening a boost valve coupled to the pressurized air source. The method continues by controlling a flow of the pressurized air from the pressurized air source with a boost flow orifice in-line with the boost valve. The next step of the method is pressurizing a boost inlet port of a compressor using the pressurized air from the pressurized air source. The method proceeds with the step of controlling a plurality of control valves of the compressor to permit flow from boost inlet port of the compressor to a manifold block. The next step is opening a plurality of suspension valves. The method concludes with the step of filling the plurality of air springs coupled to the plurality of suspension valves at a controlled rate using the pressurized air from the pressurized air source.

The invention in its broadest aspect therefore provides a compact, cost effective air management system while providing desirable exhaust flow rates.

DRAWINGS

Advantages of the present invention will be readily appreciated, as the same becomes better understood by reference to the following detailed description when considered in connection with the accompanying drawings wherein.

Figure 4:
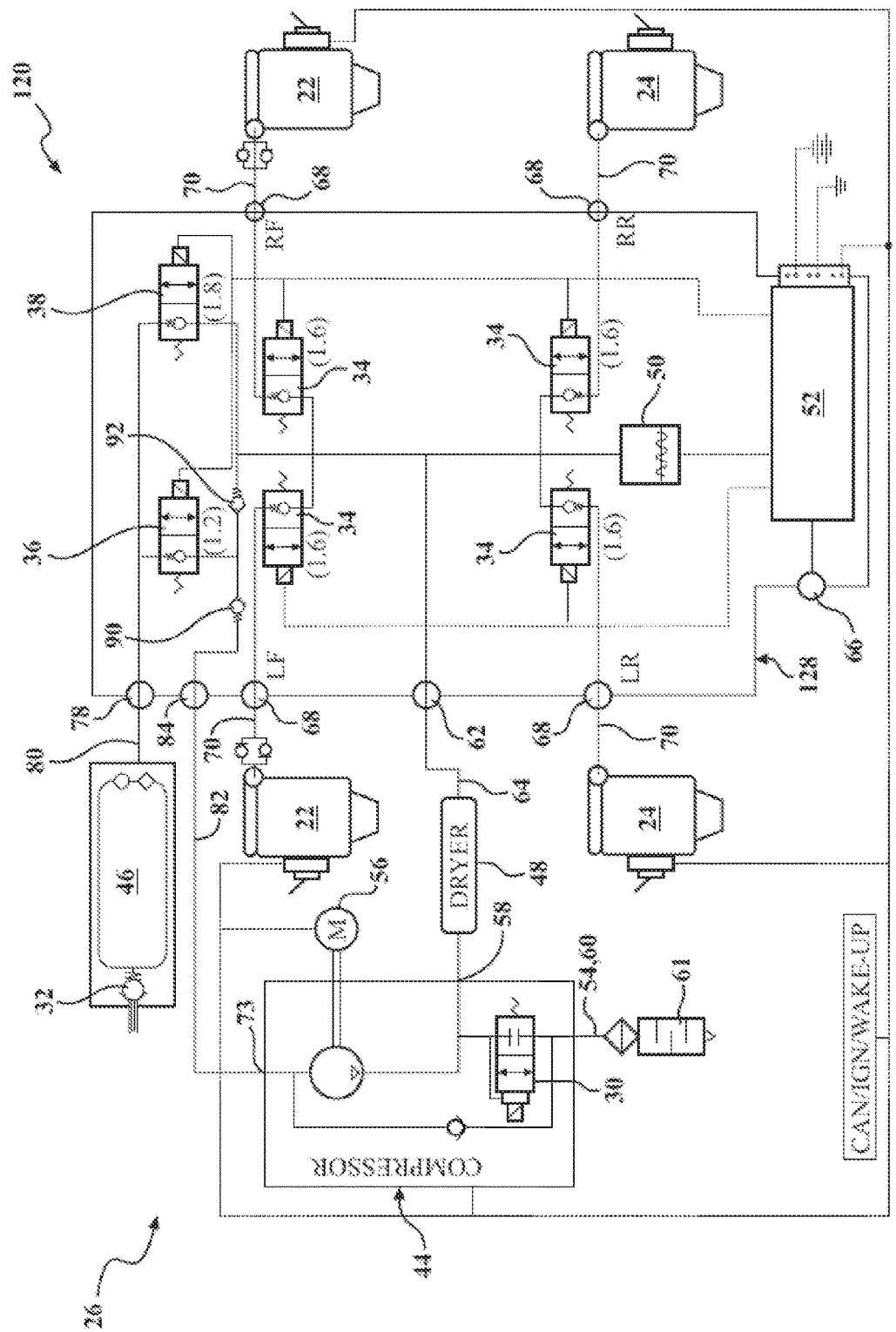
FIG. 4 is a schematic diagram of an air management system according to aspects of the disclosure.
Figure 13A:
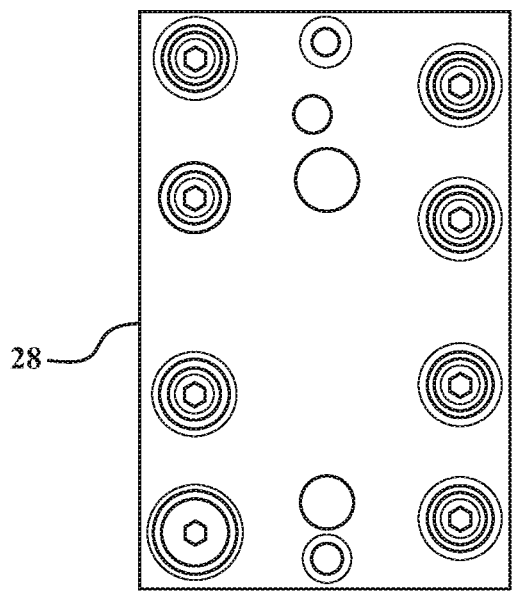
Figure 13B:
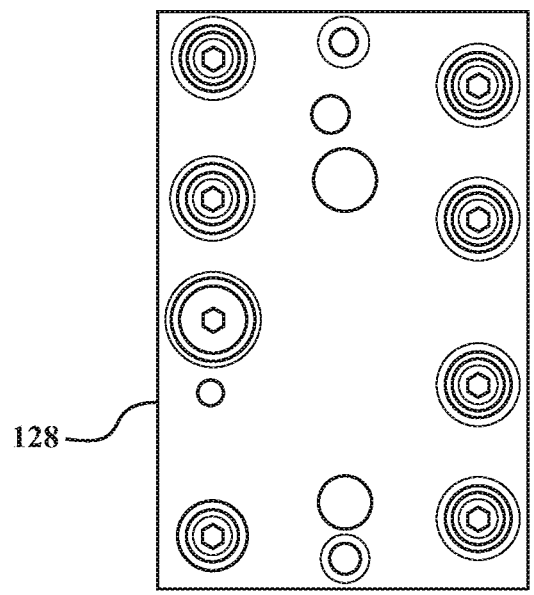
Figure 14A:
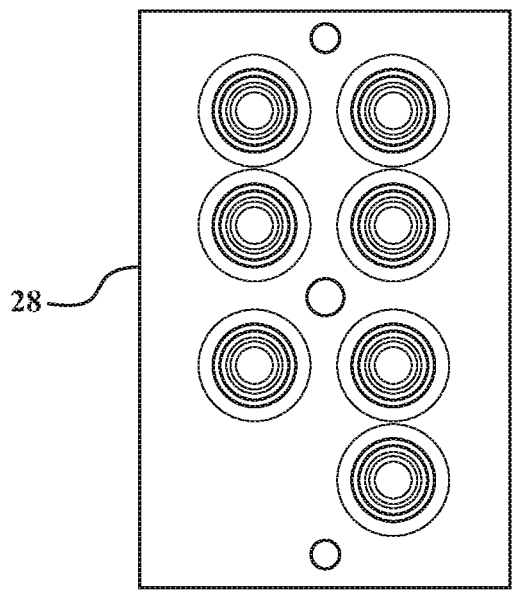
Figure 14B:
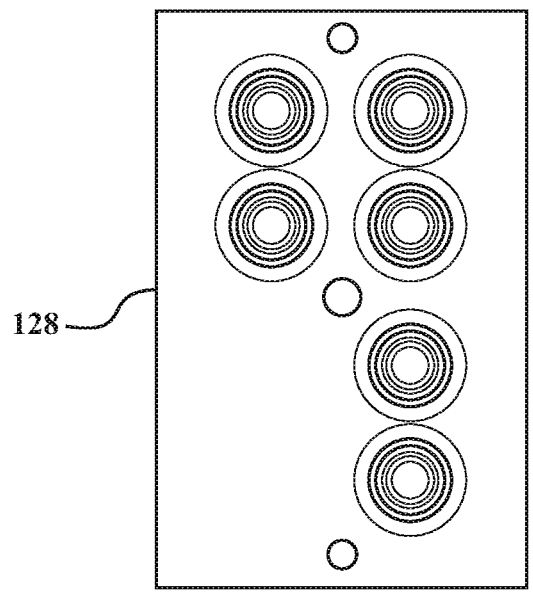

FIGS. 13A, 14A, and 15A illustrate a manifold block of the air management system of FIG. 1 according to aspects of the disclosure; and FIGS. 13B, 14B, and 15B illustrate a manifold block of the air management system of FIG. 4 according to aspects of the disclosure.

DETAILED DESCRIPTION

Referring to the Figures, example embodiments of an air management system 20, 120 are generally shown for controlling an air suspension assembly of an automotive vehicle having a body and four wheels. Additionally, a method of operating the air management systems 20, 120 is also disclosed.

Figure 1A:
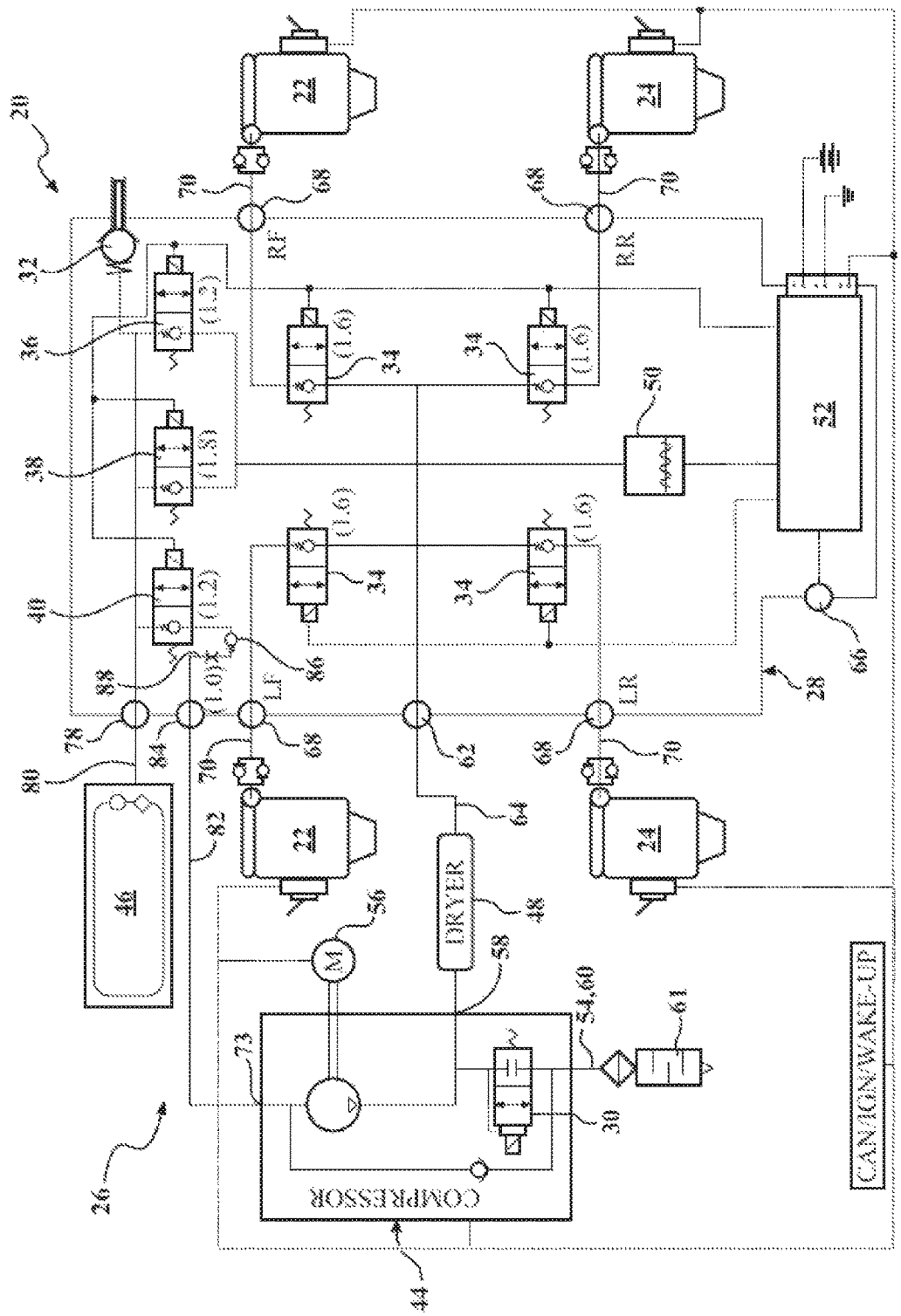
FIGS. 1A and 1B are schematic diagrams of an air management system according to aspects of the disclosure.

As best presented in FIG. 1A, a first embodiment of the air management system 20 (i.e., seven valve design) connects to a pair of front air springs 22 that interconnect the body and the front wheels of the vehicle, and a pair of rear air springs 24 that interconnect the body and the rear wheels of the vehicle. The air springs 22, 24 dampen relative forces between the body and wheels, and raise and lower the automotive vehicle to a desired height.

The air management system 20 includes a pressurized air source 26 generally connected to the air springs 22, 24 for providing pressurized air for filling the air springs 22, 24, a manifold block 28 coupled to the pressurized air source 26 and including a plurality of valves 30, 32, 34, 36, 38, 40 for controlling which air springs 22, 24 are filled and emptied. More specifically, the pressurized air source 26 includes a compressor 44 and a reservoir tank 46 for containing a pressurized volume of air. It should be appreciated that while the pressurized air source 26 comprises both a reservoir tank 46 and compressor 44, the pressurized air source 26 could instead include other components capable of providing pressurized air and/or include only the compressor 44, for example. The air management system 20 also includes a dryer 48 for reducing the moisture content of the air in the air management system 20 and at least one pressure sensor 50 for determining the pressure in the air management system 20. Furthermore, the air management system 20 includes an electronic control unit 52 disposed in or coupled with the manifold block 28 (FIGS. 2A-2D) and is electrically coupled to the valves 30, 32, 34, 36, 38, 40 and compressor 44 for controlling the air management system 20. The electronic control unit 52 can thus operate the compressor 44, valves 30, 32, 34, 36, 38, 40 and fill or empty the air springs 22, 24. The height varying capabilities of the air management system 20 can be used to perform such functions as maintaining the vehicle ride height due to load variation, lowering the vehicle at speed to provide for improved fuel economy, lowering the vehicle to provide for ease in entering and exiting the vehicle, and for adjusting the height of respective sides of the vehicle for compensating for side-to-side load variations of the vehicle.

The compressor 44 defines an air inlet 54 for receiving air into the compressor 44, as well as a motor 56 for drawing air through the air inlet 54. The compressor 44 also defines a primary outlet 58 for fluidly connecting the compressor 44 with, and providing air to the reservoir tank 46 and air springs 22, 24 through the manifold block 28. Furthermore, the compressor 44 defines an exhaust outlet 60 for exhausting or relieving air from the air management system 20. An exhaust silencer 61 connects to the exhaust outlet 60. A boost inlet port 73 may also be present to enhance performance of the compressor 44. The compressor 44 includes an exhaust valve 30 electrically coupled to and controlled by the electronic control unit 52 for selectively opening and closing the exhaust valve 30 to inhibit or allow air to pass through the exhaust outlet 60. The compressor 44 may also include a series of other control valves that enable functions of the compressor 44, such as pressure, exhaust, and boost.

The manifold block 28 fluidly connects the air springs 22, 24, compressor 44, dryer 48, and reservoir tank 46. The manifold block 28 defines a compressor inlet port 62. A base pneumatic line 64 extends between the primary outlet 58 of the compressor 44 and the compressor inlet port 62 of the manifold block 28 for conveying air between the manifold block 28 and the compressor 44.

The manifold block also 28 defines a boost port 84. A boost line 82 extends between the boost inlet port 73 of the compressor 44 and the boost port 84 of the manifold block 28 for conveying supplemental air between the manifold block 28 and the compressor 44.

The manifold block 28 additionally defines an external vent 66 to vent the electronic control unit 52. A reservoir fill valve 32 is also disposed in the manifold block 28 for filling the reservoir tank 46. Alternatively, the reservoir fill valve 32 may be coupled to the reservoir tank 46 itself (FIG. 4).

The manifold block 28 further defines four suspension ports 68 that are each fluidly connected to the compressor inlet port 62 inside the manifold block 28. A plurality of suspension pneumatic lines 70 each extend between one of the suspension ports 68 and one of the air springs 22, 24 for conveying air between the manifold block 28 and air springs 22, 24. The manifold block 28 further includes a plurality of suspension valves 34, each in line with one of the suspension ports 68 inside the manifold block 28 for inhibiting and allowing air to be conveyed between the manifold block 28 and the respective air springs 22, 24. The suspension valves 34 are each electrically coupled with the electronic control unit 52 for selectively opening and closing the suspension valves 34.

To provide high flows on exhaust for a four wheel air suspension system, four suspension valves 34 are utilized—one per each corner of the vehicle. The four suspension valves 34 can be utilized to exhaust a single axle at any given time in order to lower the vehicle equally from front to rear. It should be understood that the disclosure is not limited to the type, number, and configuration of the suspension valves 34 illustrated in the Figures and discussed herein and could instead utilize any design which isolates the manifold block 28 from the air springs 22, 24.

Figure 3A:
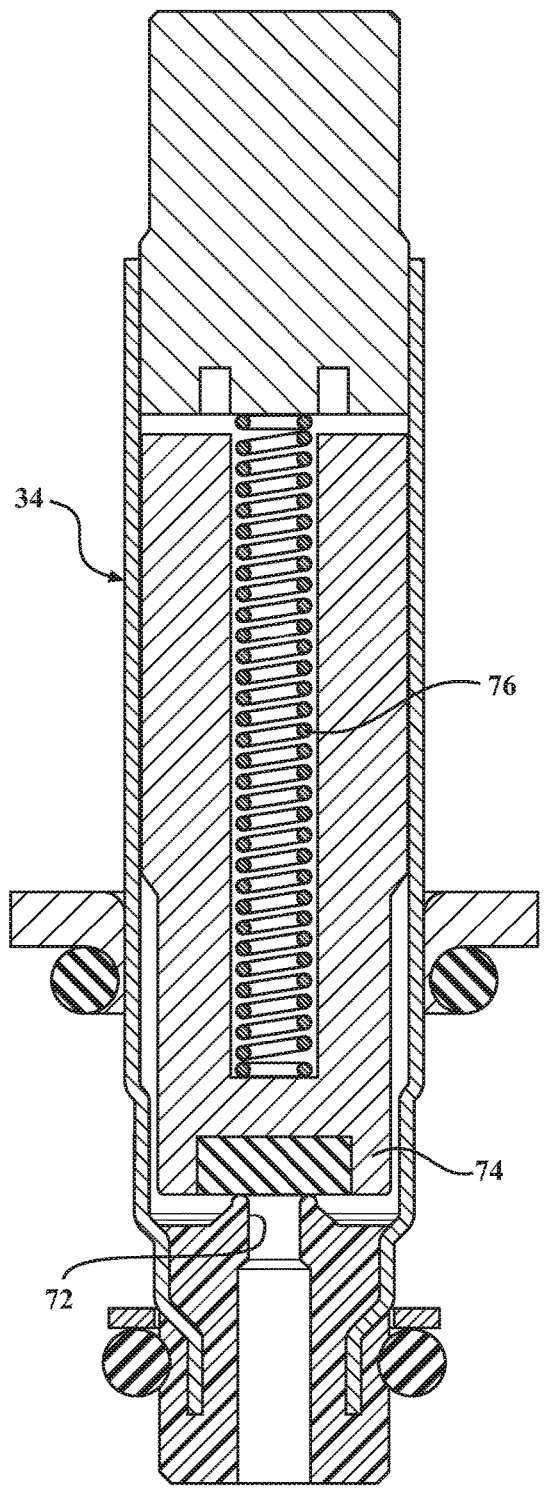
FIGS. 3A-3C illustrate a suspension valve of an air management system according to aspects of the disclosure.
Figure 3B:
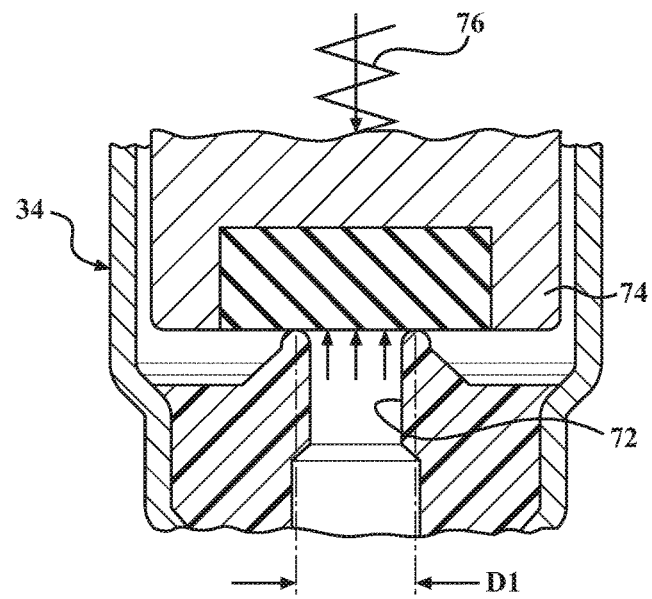
Figure 3C:
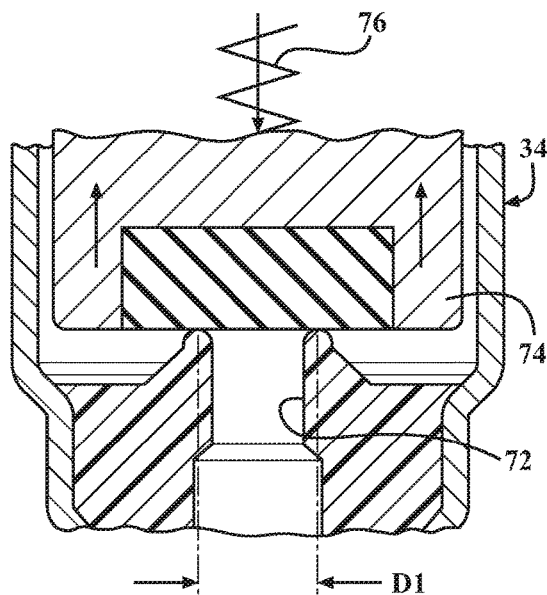

Each of the plurality of suspension valves 34 defines a suspension orifice 72 of a first diameter D1 (FIGS. 3B and 3C). Preferably, the first diameter is between 1.0 millimeters and 2.0 millimeters, however other diameters may be utilized depending on desired flow rates and other system design parameters. Specifically, required exhaust flow rates typically determine sizing of the valves 30, 32, 34, 36, 38, 40. In the Figures, the diameters of the valves 34, 36, 38, 40 are shown in parentheses. The inventors have found that modified hydraulic valves commonly utilized in antilock braking systems (ABS) can, for example, be used in with the air management systems 20, 120 disclosed herein.

As best shown in FIG. 3A, a single suspension valve 34 is shown and includes a plug 74 biased by poppet hold down spring 76 and engaging the suspension orifice 72. In designs of pneumatic valves 30, 32, 34, 36, 38, 40 for the manifold block 28, such as those utilized herein, orifice size can be important for a number of reasons. First, it determines air flow for a given pressure differential. Second, it drives the size of the poppet hold down spring 76 if counter-flow sealing (FIG. 3B) is required (i.e., the poppet hold down spring 76 must be strong enough to prevent counter-flow per design requirements). Third, it proportionally requires a larger force to open in pro-seal (FIG. 3C) mode—i.e., the magnetic force must be strong enough to open up against the spring force and pressure force. Finally, orifice size drives cost, size, and mass of the coil assembly that provides the magnetic force. Thus, large orifice sizes with counter-flow sealing requirements increase magnetic force requirements by both pressure and spring factors. However, the air management systems 20, 120 disclosed help minimize valve orifice size requirements and consequently yield significant cost savings.

Referring back to FIG. 1A, the reservoir tank 46 stores pressurized air from the compressor 44 for being distributed to the air springs 22, 24. Because of the stored energy of the pressurized air in the reservoir tank 46, the air management system 20 is able to adjust the height of each wheel independently and can elevate the vehicle much quicker due than it would be able to without the reservoir tank 46. The manifold block 28 defines a reservoir port 78 that is fluidly connected to the suspension ports 68 and compressor inlet port 62. A reservoir pneumatic line 80 extends from the reservoir port 78 to the reservoir tank 46 for conveying air between the manifold block 28 and the reservoir tank 46.

The manifold block 28 further includes a manifold pressurization valve 36 and a reservoir valve 38 that are each disposed in line with the reservoir port 78 inside the manifold block 28 and electrically coupled to and controlled by the electronic control unit 52 for selectively inhibiting and allowing air to be conveyed between the manifold block 28 and pressurized air source 26 (i.e., reservoir tank 46). Thus, the manifold pressurization valve 36 is in fluid communication with the plurality of suspension valves 34 and the pressurized air source 26. The manifold pressurization valve 36 defines a manifold pressurization orifice of a second diameter that is less than the first diameter of the suspension orifice 72 for opening under high pressure to allow the compressed or pressurized air from the pressurized air source 26 into the manifold block 28. Preferably, the second diameter is between 0.6 millimeters and 1.4 millimeters, however other diameters may be utilized. The reservoir valve 38 defines a reservoir orifice of a fourth diameter that is greater than the second diameter of the manifold pressurization orifice (e.g., 1.8 millimeters). The manifold pressurization valve 36 and reservoir valve 38 are each electrically coupled with the electronic control unit 52 for selectively opening and closing the manifold pressurization valve 36 and reservoir valve 38. The manifold pressurization valve 36 and reservoir valve 38 are positioned in parallel relationship to one another, allowing one or both to be closed at any given time. While both manifold pressurization valve 36 and reservoir valve 38 are disclosed, it should be understood that the manifold block 28 may only include a manifold pressurization valve 36, for example.

The electronic control unit 52 controls a sequence of operating the manifold pressurization valve 36 and the plurality of suspension valves 34 to equalize a high pressure differential across the plurality of suspension valves 34 from the plurality of air springs 22, 24 (e.g., when exhausting high pressure from the air springs 22, 24). Thus, because the manifold pressurization valve 36 can operate under high pressure and equalize the pressure differential at each suspension valve 34 (i.e., create an initial pressure equalization in the manifold circuit), suspension valves 34 that are used may have larger suspension orifices 72 while negating the need for larger magnetic forces. More specifically, the suspension orifice 72 of each of the plurality of suspension valves 34 is primarily limited by the size of the poppet hold down spring 76 needed for counter-flow requirements. As an example, the small 1.2 millimeter diameter manifold pressurization orifice of the manifold pressurization valve 36 can be used to pre-pressurize the entire manifold block 28, and allow the larger 1.6 millimeter suspension orifice 72 of each of the suspension valves 34 (i.e., blocker valves) to open under worst case pressure, temperature, and voltage conditions.

In addition, because of the presence of both the manifold pressurization valve 36 and reservoir valve 38, three distinct flow rates of air being conveyed through the manifold pressurization valve 36 and reservoir valve 38 are possible: 1) maximum flow—when the manifold pressurization valve 36 and reservoir valve 38 are open 2) manifold pressurization valve 36 half flow—when the manifold pressurization valve 36 is opened and reservoir valve 38 is closed, and 3) reservoir valve 38 half flow—when the reservoir valve 38 is opened and the manifold pressurization valve 36 is closed. It should be appreciated that under certain operating conditions, it can be desirable to utilize different flow rates of air into the air springs 22, 24 to fill the air springs 22, 24 at faster or slower rates.

Certain types of compressors 44 can have nominal air flow increased by introducing additional pressure from an external source. Consequently, the manifold block 28 also includes a boost valve 40 electrically coupled to and controlled by the electronic control unit 52 and the boost line 82 extends between the reservoir tank 46 and boost inlet port 73 of the compressor 44 for selectively directly connecting the reservoir tank 46 and the boost inlet port 73 of the compressor 44. Air from the reservoir tank 46 can be used to boost the output of the compressor 44 and consequently the air springs 22, 24 may be filled more quickly than when not boosted. The boost valve 40 defines a boost orifice of a third diameter that is less than the second diameter of the manifold pressurization orifice. The boost valve 40 is electrically coupled to the electronic control unit 52 for selectively opening and closing the boost valve 40. The manifold block 28 additionally includes a boost check valve 86 disposed between the boost valve 40 and the boost port 84 to allow air flow from the reservoir tank 46 through the boost valve 40 to the boost port 84 and prevent air flow from the boost port 84 toward the boost valve 40. A separate boost flow orifice 88 (e.g. 1.0 millimeters or smaller) can also be added externally to provide the desired flow effects or for example, the manifold block 28 may include the boost flow orifice 88 disposed between the boost valve 40 and the boost port 84 to regulate air flow from the reservoir tank 46 to the boost port 84.

The dryer 48 couples to the primary outlet 58 of the compressor 44. It should be understood that the dryer 48, could, for example, be integrated in the compressor 44, in which case it would be coupled to the primary outlet 58 of the compressor 44 through a series of passageways (not shown) and control valves. The dryer 48 reduces moisture in the air being conveyed through the base pneumatic line 64 to the manifold block 28 before it enters the reservoir tank 46 and air springs 22, 24. Moisture is a common issue for such pressurized systems, as water vapor in the atmosphere can condense out inside the unit and create concerns for corrosion as well as freezing components in cold weather conditions. The dryer 48 typically includes a desiccant disposed therein for absorbing excess moisture in the system that is conveyed through the base pneumatic line 64, for example. The moisture content of the desiccant is increased as air passes through the base dryer 48 away from the compressor 44, and the moisture content of the desiccant is decreased as air passes through the dryer 48 and out the exhaust outlet 60 and exhaust silencer 61. Additional control valves in the compressor 44 may be utilized to direct flow.

The pressure sensor 50 is disposed in the manifold block 28 and electrically coupled to the electronic control unit 52 for measuring the pressure in the manifold block 28, pressurized air source 26 (e.g., reservoir tank 46), and/or air springs 22, 24. In order to obtain individual readings of each of the air springs 22, 24 or the reservoir tank 46, the manifold block 28 may be evacuated and then the valve for the device in question is momentarily opened.

Figure 1B:
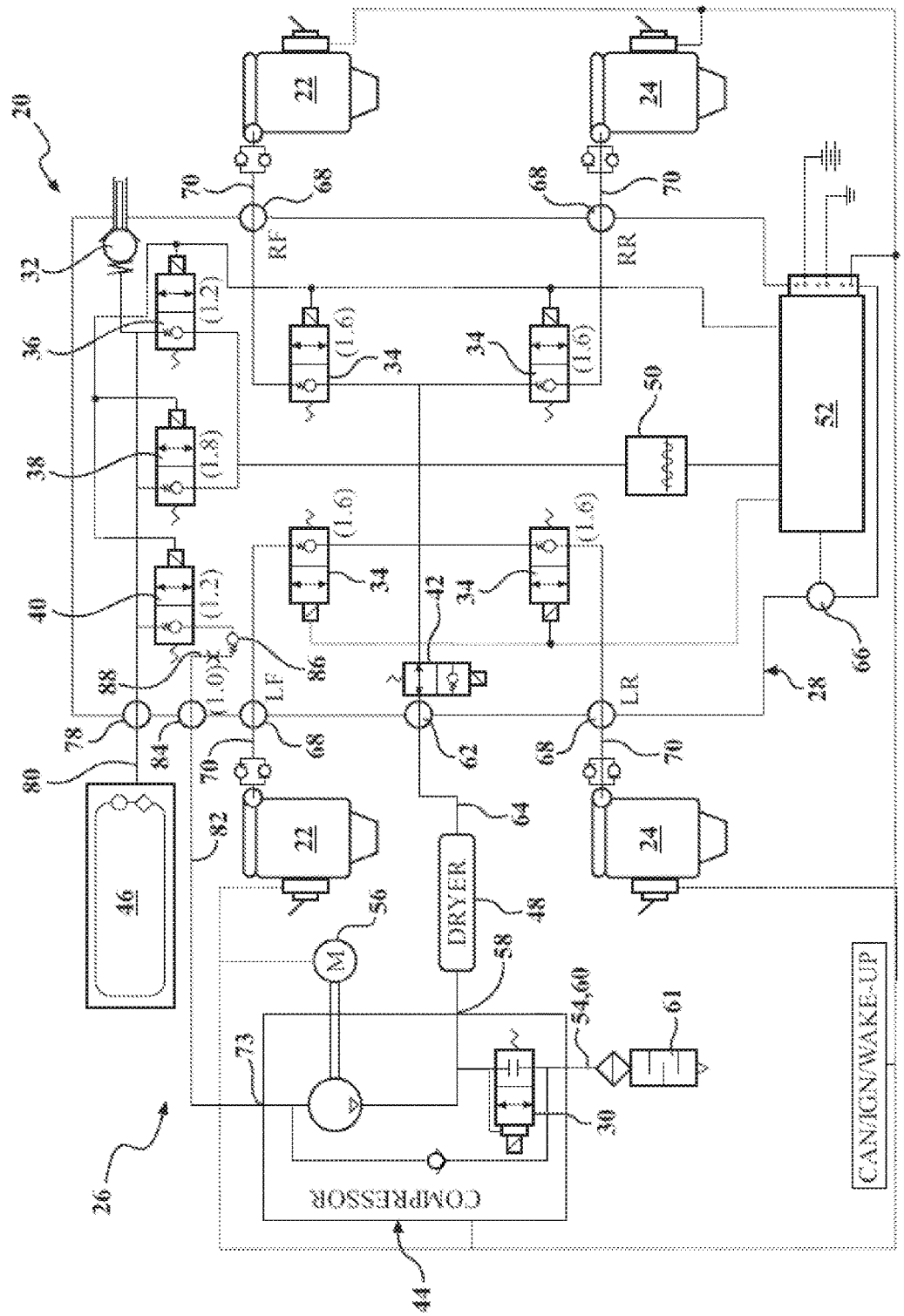
Figure 2A:
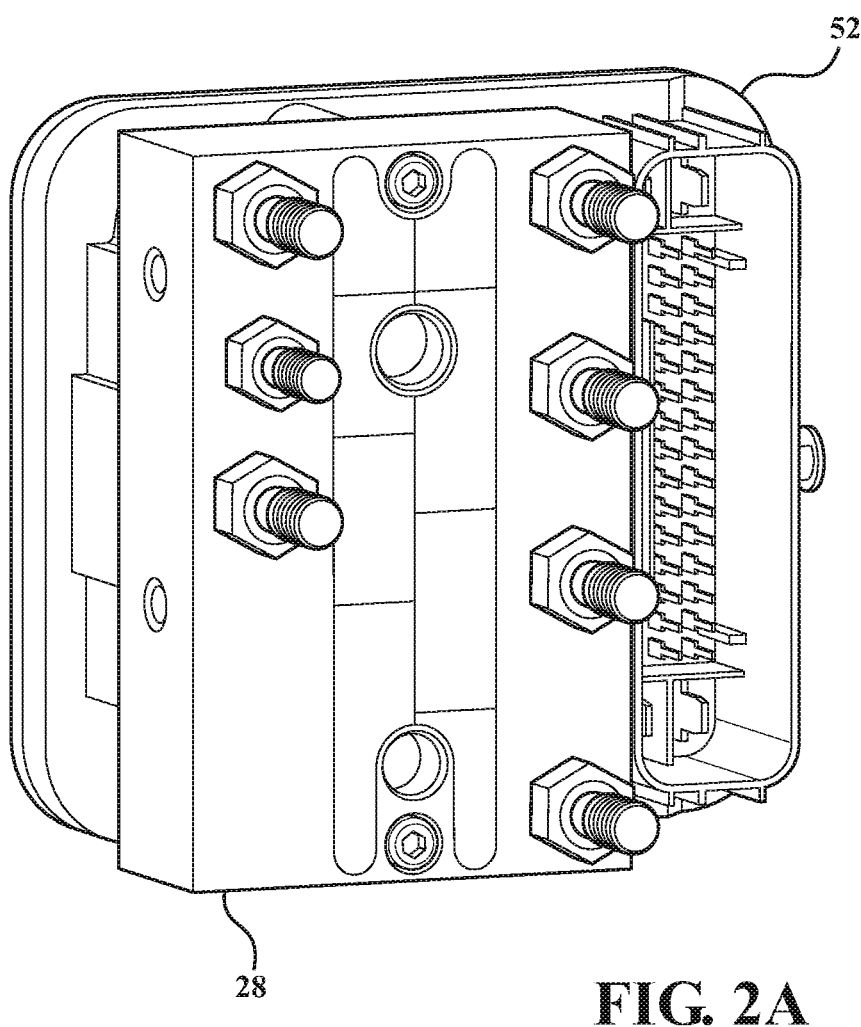
FIGS. 2A-2D illustrate a manifold block of an air management system integrated with an electronic control unit according to aspects of the disclosure.
Figure 2B:
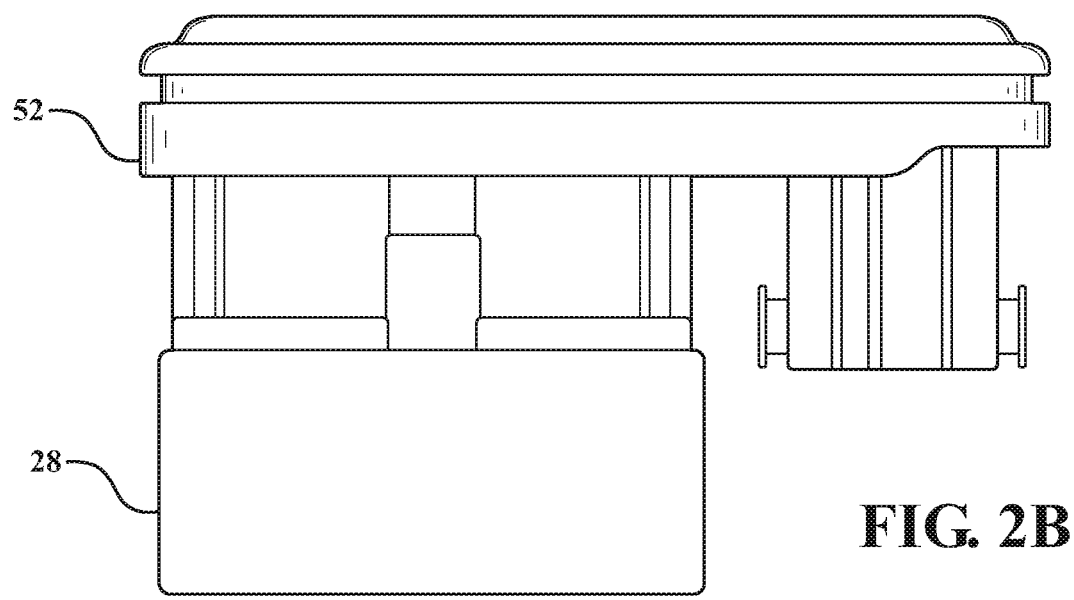
Figure 2C:
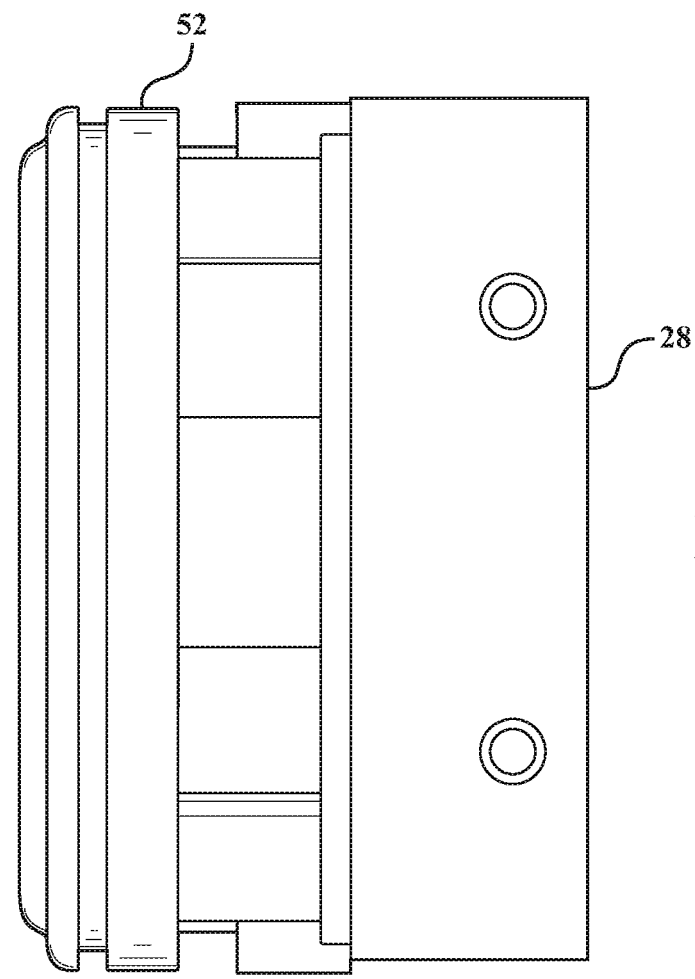
Figure 2D:
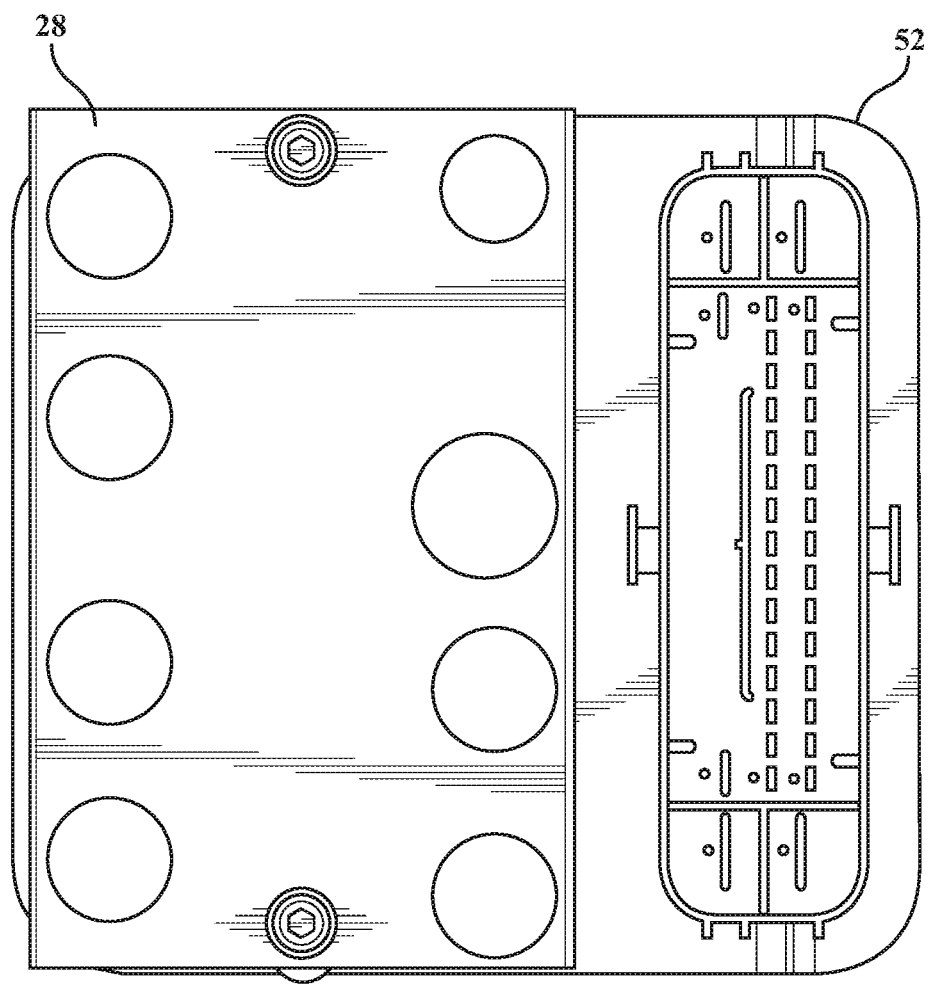

As best shown in FIG. 1B, an optional normally open dryer control valve 42 can be provided in-line with the compressor inlet port 62. It may also be substituted for the reservoir valves 38 or manifold pressurization valve 36 for cost reduction purposes. Specifically, the dryer control valve 42 can be disposed at the compressor inlet port 62; however, it can alternatively be integrated into the compressor 44. The dryer control valve 42 can also be electrically coupled to the electronic control unit 52 for selectively opening and closing the dryer control valve 42. In most circumstances, the dryer control valve 42 may be left open to permit air flow back and forth to and from the manifold block 28. However, when an individual pressure reading is required of either the reservoir tank 46 or of any combination of the air springs 22, 24, the dryer control valve 42 can be closed along with the air springs 22, 24 or other air springs 22, 24 and reservoir tank 46, thus isolating the volume of the dryer 48 from the manifold block 28. Since the manifold block 28 consists largely of small drilled holes connecting the components together, with the dryer control valve 42 closed, there is very little air volume exposed to the pressure sensor 50 as opposed to the volume of the manifold block 28, dryer 48, and base pneumatic line 64. This allows the pressure reading of a specific device to stabilize almost instantaneously and with very little air volume loss, thus making them much faster and more efficient. Accordingly, utilization of the dryer control valve 42 can improve the speed and efficiency of taking pressure readings.

Air management systems 20 may require higher flows on exhaust due to minimum flow rates required by the air dryer 48 as well as for customer requirements. Additionally, overall system exhaust flow is typically controlled by the size of the air dryer 48 (i.e., orifice of the air dryer 48). The air management systems 20 described herein preferably use dryer orifices with diameters of 2.0 millimeters or less.

It should also be appreciated that the configuration of the air management systems 20, 120 disclosed herein provide for fast exhaust rates to meet the minimum flow requirements of the air dryer 48. As such, this assures that the exhausted air will serve to adequately replenish the desiccant in dryer 48.

As best presented in FIG. 4, a second embodiment of the air management system 120 (i.e., six valve design) is generally shown, where like numerals refer to like parts of the first embodiment. Therefore, only the differences between the first embodiment and the second embodiment are described. The second embodiment of the air management system 120 does not include a boost valve 40 and instead, the manifold pressurization valve 36 is additionally coupled to the reservoir tank 46 and to boost port 84 with the boost line 82 (i.e., to the boost inlet port 73 of the compressor 44 for selectively directly connecting the reservoir tank 46 and boost inlet port 73 of the compressor 44). So, the manifold pressurization valve 36 of the second embodiment can control at least three functions including, pre-charging the manifold block 128 for the large orifice reservoir valve 38, pre-charging the manifold block 128 for the large orifice suspension valves 34, and admitting pressurized air from the reservoir tank 46 to the boost inlet port 73 of the compressor 44.

In the second embodiment of the air management system 20, a first manifold check valve 90 is disposed between the manifold pressurization valve 36 and the boost port 84 to allow flow of air from the reservoir tank 46 through the manifold pressurization valve 36 to the boost port 84, but prevent air flow in the opposite direction (i.e., flow from the boost port 84 toward the manifold pressurization valve 36 and the suspension valves 34). A second manifold check valve 92 is disposed between the manifold pressurization valve 36 and the suspension valves 34 to allow flow of air from the reservoir tank 46 through the manifold pressurization valve 36 to the suspension valves 34, but to prevent air flow in the opposite direction (i.e., flow from the suspension valves 34 toward the manifold pressurization valve 36). The second manifold check valve 92 also can prevent air flow generated from the compressor 44 which pressurizes the manifold block 128 above a pressure in the reservoir tank 46 from flowing back into the reservoir tank 46 (which is at a lower pressure) via the open manifold pressurization valve 36 which is behaving as a boost valve.

Figure 5:
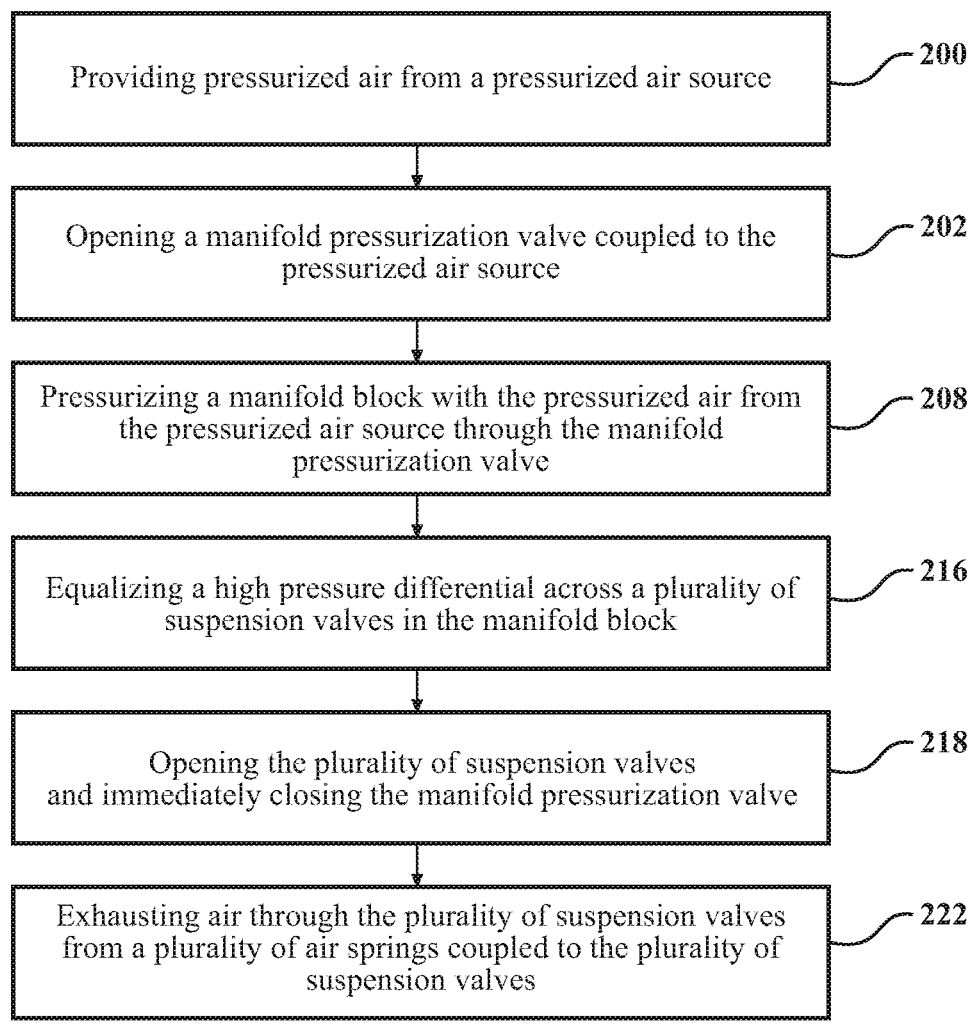
FIGS. 5 and 6 are flow charts illustrating steps of methods of operating the air management system according to aspects of the disclosure.
Figure 6:
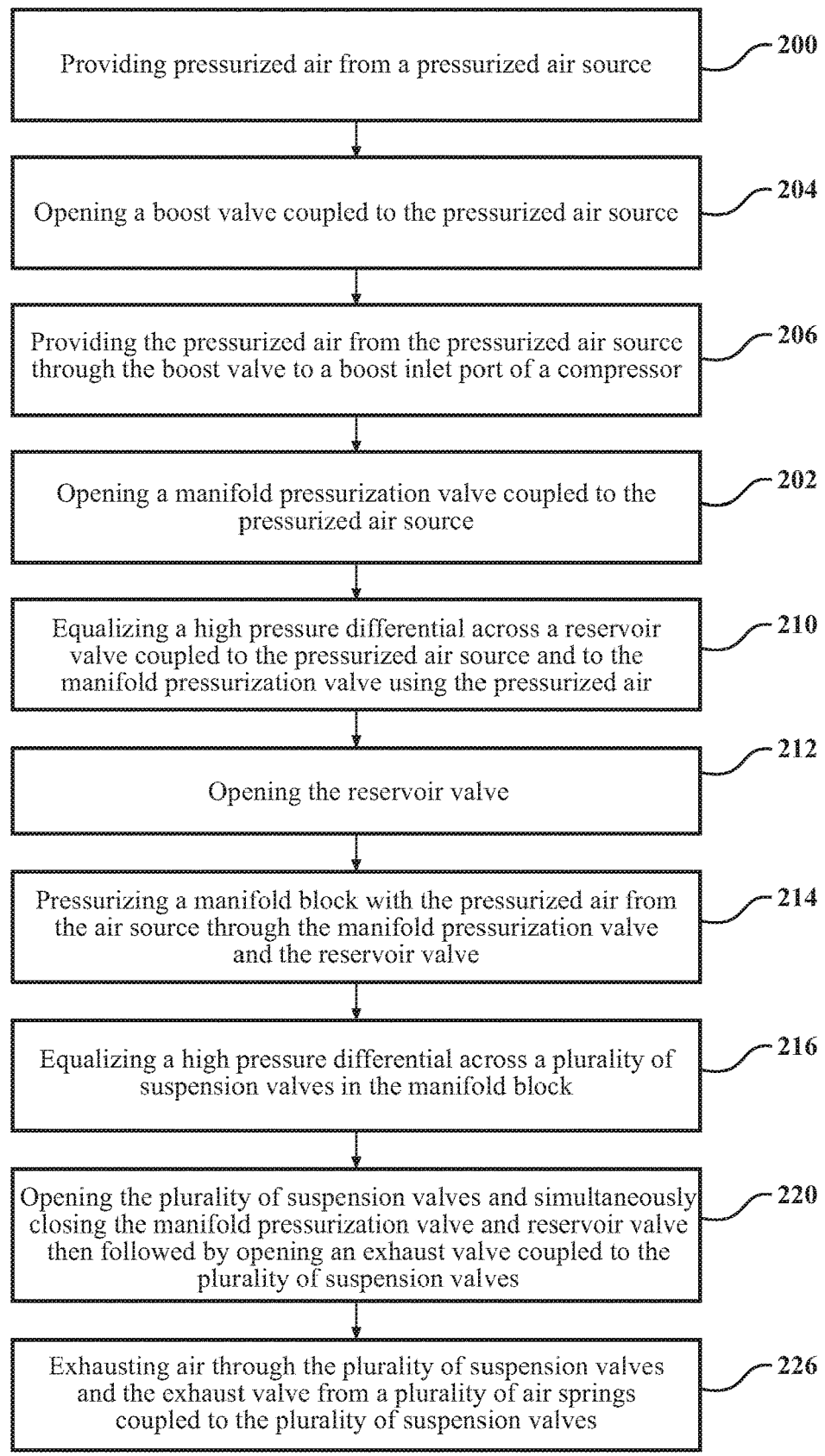
Figure 7:
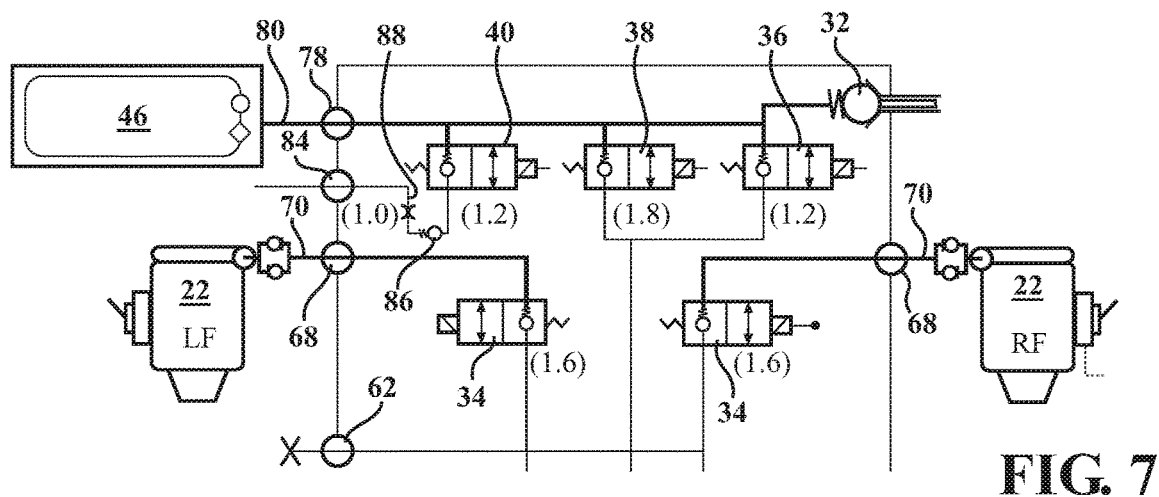
FIG. 7 illustrates a partial view of the air management system of FIG. 1 during a step of providing pressurized air from a pressurized air source according to aspects of the disclosure.
Figure 8:
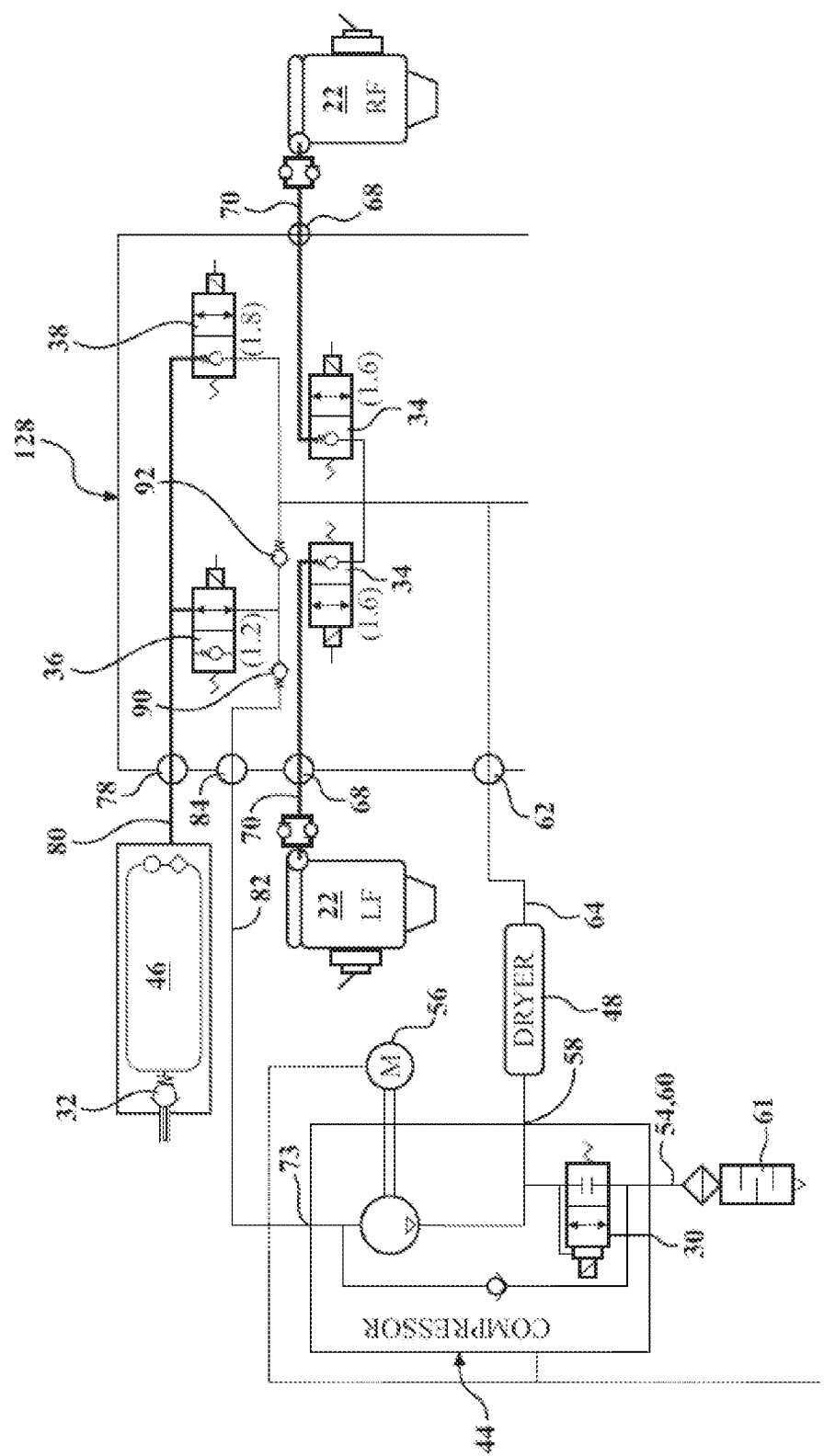
FIG. 8 illustrates a partial view of the air management system of FIG. 4 during a step of providing pressurized air from the pressurized air source according to aspects of the disclosure.

As illustrated in FIGS. 5 and 6, a method for operating the air management systems 20, 120 to control an air suspension assembly of an automotive vehicle is also provided. The method includes the step of 200 providing pressurized air from a pressurized air source 26. In a situation when the air springs 22, 24 of the first embodiment of the air management system 20 are pressurized, and the reservoir tank 46 is also pressurized, the manifold block 28 is at atmosphere, and the exhaust valve 30 of compressor 44 is closed (as well as any other control valves of the compressor 44), there may not be sufficient magnetic force in each of the plurality of suspension valves 34 if they include larger suspension orifices 72, such as 1.6 millimeters, for example (FIG. 7, where heavier lines indicate air flow) to be opened. Likewise, in a similar situation for the second embodiment, neither the reservoir valve 38 (e.g., 1.8 millimeter reservoir orifice), nor the plurality of suspension valves 34 (e.g., 1.6 millimeter suspension orifices 72) may be able to open under high pressure, especially at high temperature, low voltage, worst case conditions (FIG. 8, where heavier lines indicate air flow). Thus, the method continues with the step of 202 opening a manifold pressurization valve 36 coupled to the pressurized air source 26 (e.g., reservoir tank 46). Because the manifold pressurization valve 36 has a manifold pressurization orifice that is smaller than the suspension orifices 72, such as 1.2 millimeters, it can be opened under high pressure, thus pressurizing the manifold block 128 to pressure levels of the reservoir tank 46.

Figure 9:
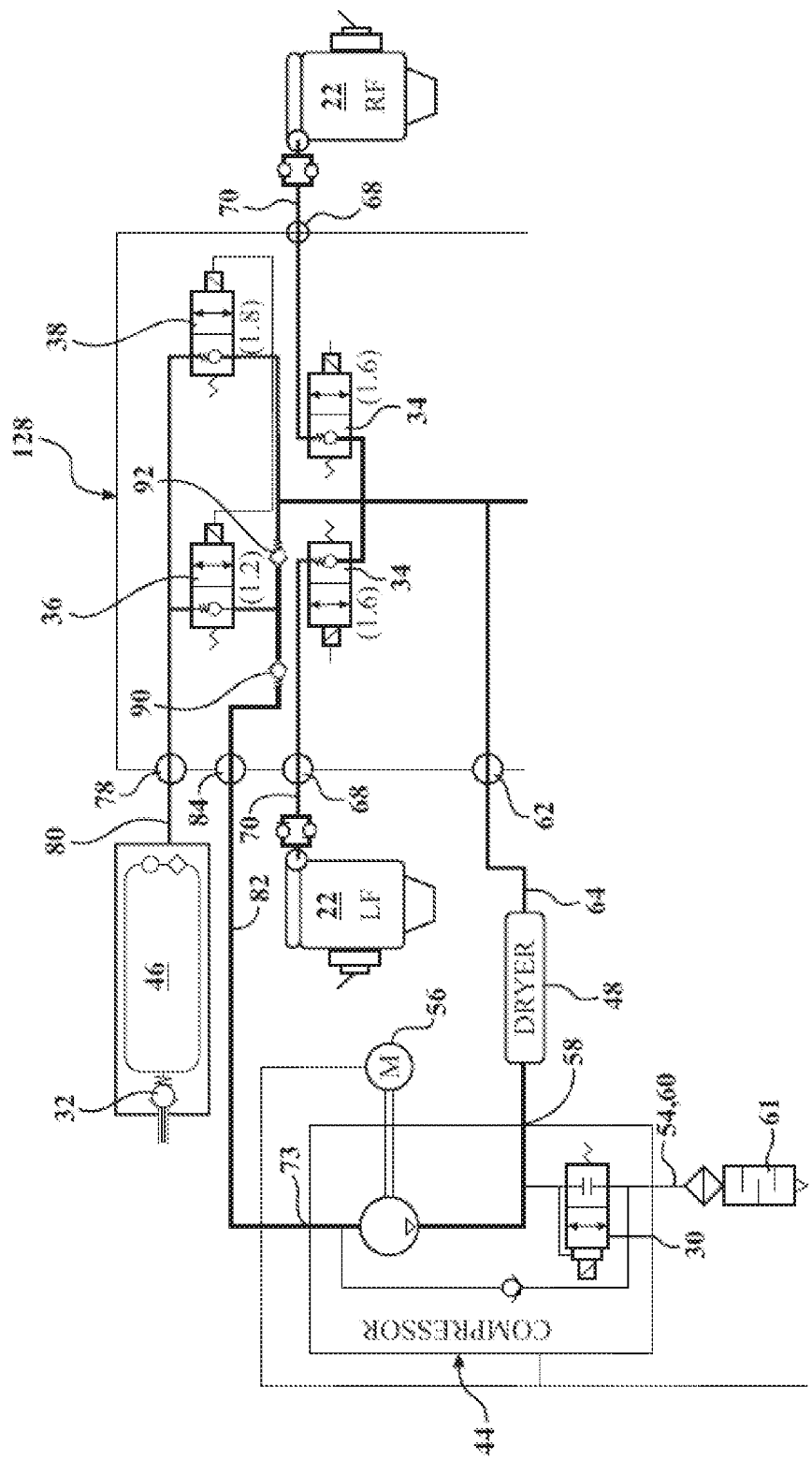
FIG. 9 illustrates a partial view of the air management system of FIG. 4 during a step of opening a manifold pressurization valve coupled to the pressurized air source according to aspects of the disclosure.
Figure 10:
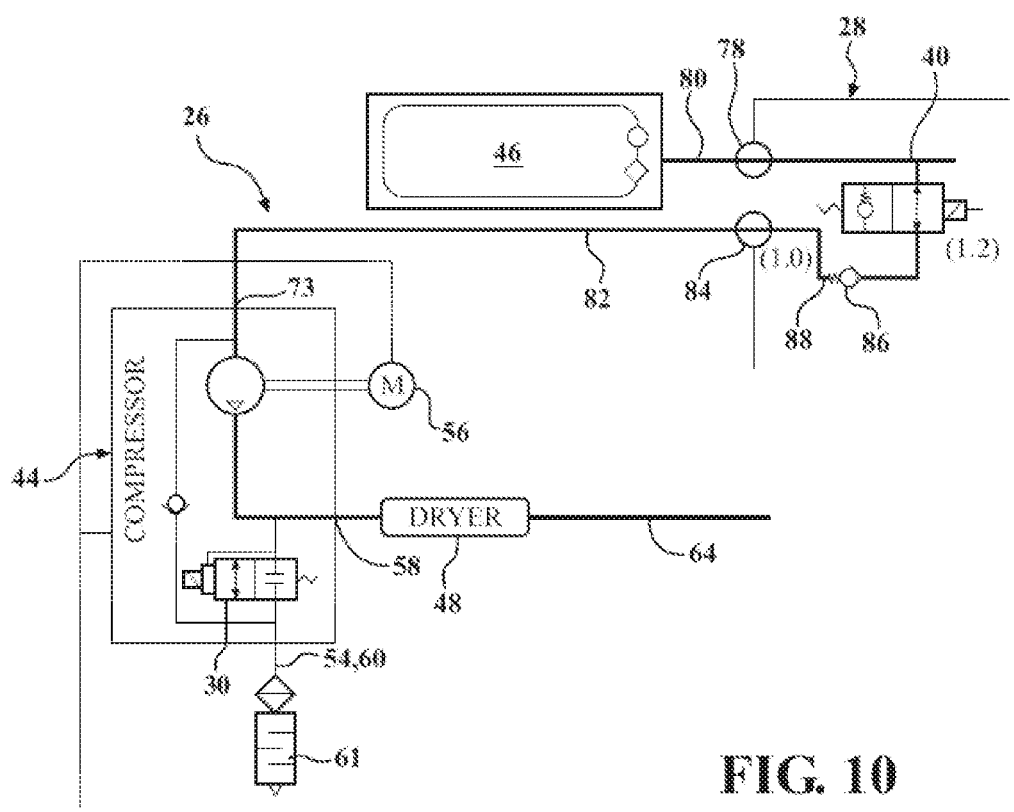
FIG. 10 illustrates a partial view of the air management system of FIG. 1 during a step of providing the pressurized air from the pressurized air source through a boost valve to an air inlet of a compressor according to aspects of the disclosure.

The step of 202 opening a manifold pressurization valve 36 coupled to the pressurized air source 26 (e.g., reservoir tank 46) can include the step of providing the pressurized air from the pressurized air source 26 through the manifold pressurization valve 36 to a boost inlet port 73 of a compressor 44. In other words, in systems such as the second embodiment of the air management system 120, the manifold pressurization valve 36 may carry out multiple functions besides pressurizing the manifold block 128, such as performing the function of the boost valve 40. So, as best shown in FIG. 9, where the heavier lines indicate air flow, the manifold pressurization valve 36 of the second embodiment of the air management system 120, with its small exposed orifice area, can open under the high pressure from the reservoir tank 46. This in turn provides the pressure from the reservoir tank 46 to the boost inlet port 73 of the compressor 44. While this type of boost control is not completely independent, it may be utilized when the savings of eliminating one valve (e.g., six valve design) is desired and/or some cost verses performance tradeoff is acceptable. Alternatively, if the system includes a boost valve 40 (e.g., as in the first embodiment of the air management system 20), the method can also include the steps of 204 opening a boost valve 40 coupled to the pressurized air source 26 (e.g., reservoir tank 46) and 206 providing the pressurized air from the pressurized air source 26 through the boost valve 40 to the boost inlet port 73 of the compressor 44. If the system includes an in-line boost flow orifice 88, the flow of air from the pressurized air source 26 can be further controlled. Similarly, any additional control valves of the compressor 44 can be controlled to permit flow from the boost inlet port 73 of the compressor 44 to the plurality of air springs 22, 24 coupled to manifold block 28. So, as best shown in FIG. 10, where the heavier lines indicate air flow, the pressure of the reservoir tank 46 of the first embodiment is high, but since the boost orifice of the boost valve 40 only needs to be approximately 1.2 millimeters, for example, the boost valve 40 can easily open under conditions in which the reservoir tank 46 is providing a high pressure. The suspension valves 34 can be opened in such a situation, and the air springs 22, 24 can be filled at a controlled rate using the boost valve 40.

The method then includes the step of 208 pressurizing a manifold block 28, 128 with the pressurized air from the air source through the manifold pressurization valve 36. More specifically, the step of 208 pressurizing a manifold block 28, 128 with the pressurized air from the air source through the manifold pressurization valve 36 can include the step of 210 equalizing a high pressure differential across a reservoir valve 38 coupled to the air source and to the manifold pressurization valve 36 using the pressurized air. Next, 212 opening the reservoir valve 38. Then, the step of 208 pressurizing a manifold block 28, 128 with the pressurized air from the air source through the manifold pressurization valve 36 can also include 214 pressurizing a manifold block 28, 128 with the pressurized air from the air source through the manifold pressurization valve 36 and the reservoir valve 38. Thus, the pressurized air from the reservoir tank 46 can flow through both the manifold pressurization valve 36 and the reservoir valve 38, or optionally closing the manifold pressurization valve 36 to pressurize the manifold block 28, 128.

Figure 11:
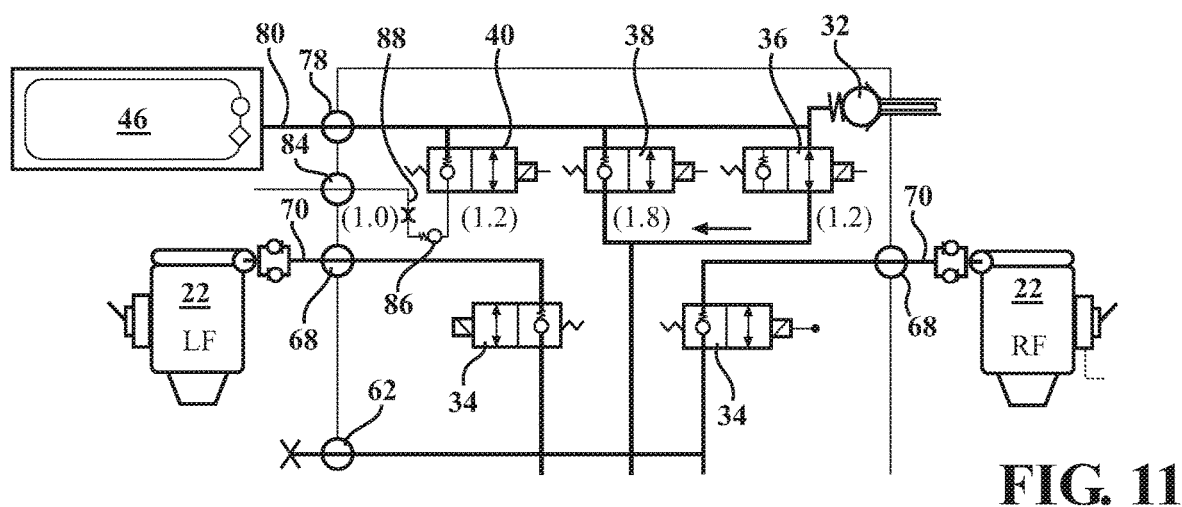
FIG. 11 illustrates a partial view of the air management system of FIG. 1 during a step of equalizing a high pressure differential across a plurality of suspension valves in the manifold block according to aspects of the disclosure.

The method proceeds with the step of 216 equalizing a high pressure differential across a plurality of suspension valves 34 in the manifold block 28. So, with the exhaust valve 30 closed, the manifold block 28, 128 is instantly brought to a high pressure, thus balancing the pressure differential across the suspension valves 34 (FIGS. 9 and 11, where the heavier lines indicate air flow). The method continues by 218 opening the plurality of suspension valves 34 and immediately closing the manifold pressurization valve 36. In more detail, the step of 218 opening the plurality of suspension valves 34 and immediately closing the manifold pressurization valve 36 can be further defined as opening the plurality of suspension valves 34 and an exhaust valve 30 coupled to the plurality of suspension valves 34 and simultaneously closing the manifold pressurization valve 36 to initiate an exhaust cycle. In the event that the method includes 212 opening the reservoir valve 38, the step of opening the plurality of suspension valves 34 and an exhaust valve 30 coupled to the suspension valves 34 and simultaneously closing the manifold pressurization valve 36 can be further defined as 220 opening the plurality of suspension valves 34 and simultaneously closing the manifold pressurization valve 36 and reservoir valve 38 then followed by opening an exhaust valve 30 coupled to the plurality of suspension valves 34.

Figure 12:
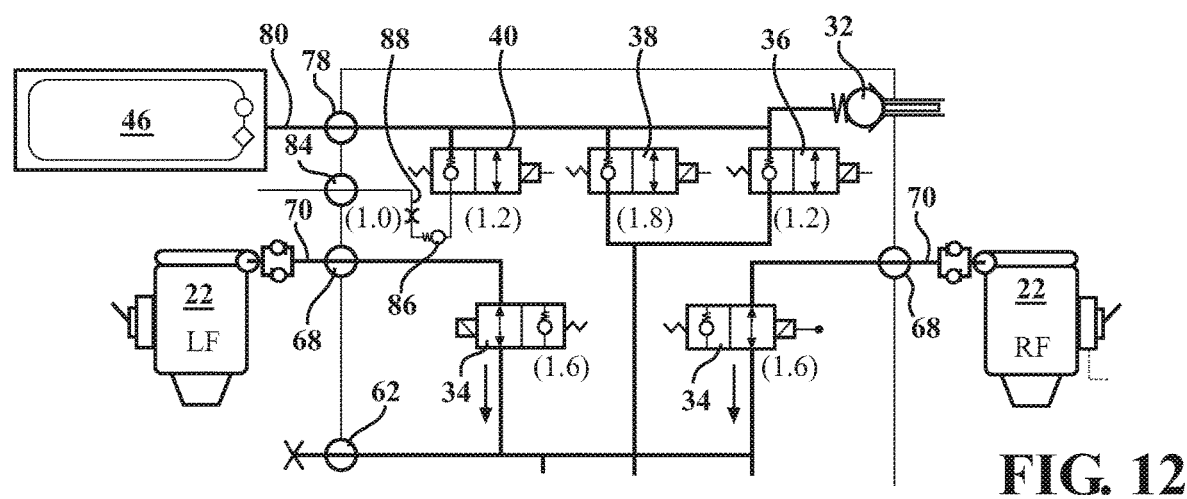
FIG. 12 illustrates a partial view of the air management system of FIG. 4 during a step of equalizing a high pressure differential across a plurality of suspension valves in the manifold block according to aspects of the disclosure.

The method also includes the step of 222 exhausting air through the plurality of suspension valves 34 from a plurality of air springs 22, 24 coupled to the plurality of suspension valves 34. In the event that the air management system 20 includes an exhaust valve 30, the step of 222 exhausting air through the plurality of suspension valves 34 from a plurality of air springs 22, 24 coupled to the plurality of suspension valves 34 can be further defined as 226 exhausting air through the plurality of suspension valves 34 and the exhaust valve 30 from a plurality of air springs 22, 24 coupled to the plurality of suspension valves 34. Full flow from the suspension valves 34 is now achieved to complete the exhaust cycle (FIGS. 9 and 12).

The air management systems 20, 120 disclosed herein therefore provide optimized exhaust flow performance from a more compact, cost effective valve design. The air management systems 20, 120 disclosed herein are designed with low cost manufacturing in mind and are able to remain within a very compact module as illustrated in FIGS. 2A-2D (e.g., less than 650 cubic centimeters). The manifold blocks 28, 128 of the first and second embodiments of the air management system 20, 120 are shown respectively in FIGS. 13A and 13B and can provide common port and valve locations. Such manifold blocks 28, 128 can also provide a totally symmetric interface to the electronic control unit 52 allowing flexibility to rotate the manifold block 28, 128 180-degrees with no physical change to the interface (FIGS. 14A and 14B). The common port and valve locations can help reduce manufacturing cost and investment.

Finally, an important consideration in minimizing manufacturing machining cost and investment is designing with complete orthogonality. As best shown in FIGS. 15A and 15B, the manifold blocks 28, 128 of the air management systems 20, 120 disclosed herein maintain this important design parameter. This eliminates the need for complex, angular fixtures or additional machining time with non-orthogonal cross-drills.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. An air management system for controlling an air suspension assembly of an automotive vehicle comprising:
   a pressurized air source;
   a manifold block coupled to said pressurized air source and including a plurality of suspension valves in fluid communication with said pressurized air source and each of said plurality of suspension valves defining a suspension orifice of a first diameter for controlling air flow to and from a plurality of air springs;
   said manifold block including a manifold pressurization valve in fluid communication with said plurality of suspension valves and said pressurized air source and defining a manifold pressurization orifice of a second diameter being less than said first diameter of said suspension orifice for opening under high pressure to allow pressurized air from said pressurized air source into said manifold block; and
   an electronic control unit electrically coupled to said plurality of suspension valves and said manifold pressurization valve for controlling a sequence of operating said manifold pressurization valve and said plurality of suspension valves to equalize a high pressure differential across said plurality of suspension valves from the plurality of air springs.

2. The air management system as set forth in claim 1, wherein said pressurized air source includes a compressor having an air inlet and a primary outlet coupled to an inlet port of said manifold block and electrically coupled to and controlled by said electronic control unit for providing the pressurized air to the plurality of air springs through said manifold block.

3. The air management system as set forth in claim 2, wherein said manifold block includes a reservoir port and said pressurized air source further includes a reservoir tank coupled to said reservoir port of said manifold block and to said compressor for storing the pressurized air from said compressor.

4. The air management system as set forth in claim 3, further including a boost valve defining a boost orifice of a third diameter being less than said second diameter of said manifold pressurization orifice and coupled to said reservoir tank and to said air inlet of said compressor and electrically coupled to and controlled by said electronic control unit for selectively directly connecting said reservoir tank and said air inlet of said compressor.

5. The air management system as set forth in claim 4, wherein said manifold block includes a boost port and said boost valve is disposed in said manifold block and a boost line extends between said reservoir tank and said boost valve.

6. The air management system as set forth in claim 5, wherein said manifold block includes a boost check valve disposed between said boost valve and said boost port to allow air flow from said reservoir tank through said boost valve to said boost port and prevent air flow from said boost port toward said boost valve.

7. The air management system as set forth in claim 3, wherein said manifold pressurization valve is coupled to said reservoir tank and to said air inlet of said compressor for selectively directly connecting said reservoir tank and said inlet of said compressor.

8. The air management system as set forth in claim 7, wherein a boost port is coupled to said air inlet of said compressor and a first manifold check valve is disposed between said manifold pressurization valve and said boost port to allow air flow from said reservoir tank through said manifold pressurization valve to said boost port and prevent air flow from said boost port toward said manifold pressurization valve and a second manifold check valve is disposed between said manifold pressurization valve and said suspension valves to allow air flow from said reservoir tank through said manifold pressurization valve to said suspension valves and prevent air flow from said suspension valves toward said manifold pressurization valve.

9. The air management system as set forth in claim 7, wherein a boost port is coupled to said air inlet of said compressor and a first manifold check valve is disposed between said manifold pressurization valve and said boost port to allow air flow from said reservoir tank through said manifold pressurization valve to said boost port and prevent air flow from said boost port toward said manifold pressurization valve and a second manifold check valve is disposed between said manifold pressurization valve and said suspension valves to prevent air flow generated from said compressor which pressurizes said manifold block above a pressure in said reservoir tank from flowing back into said reservoir tank via said manifold pressurization valve which is behaving as a boost valve.

10. The air management system as set forth in claim 7, wherein said manifold block includes a reservoir valve defining a reservoir orifice of a fourth diameter being greater than said second diameter of said manifold pressurization orifice and coupled to said reservoir tank in parallel with said manifold pressurization valve and electrically coupled to and controlled by said electronic control unit for selectively allowing and inhibiting air to be conveyed between said suspension valves and said reservoir tank.

11. The air management system as set forth in claim 3, wherein said compressor includes a dryer coupled to said primary outlet for reducing moisture in air conveyed to said manifold block before entering said reservoir tank and the plurality of air springs.

12. The air management system as set forth in claim 11, wherein said manifold block includes a dryer control valve disposed at said inlet port and electrically coupled to and controlled by said electronic control unit for selectively opening and allowing air flow to and from said manifold block.

13. The air management system as set forth in claim 2, wherein said compressor includes an exhaust outlet and an exhaust valve coupled with said exhaust outlet and electrically coupled to and controlled by said electronic control unit for inhibiting and allowing air to pass through said exhaust outlet.

14. The air management system as set forth in claim 1, wherein said manifold block includes a pressure sensor electrically coupled to and controlled by said electronic control unit for measuring air pressure in at least one of said manifold block and said pressurized air source and the plurality of air springs.

15. A method of operating an air management system to control an air suspension assembly of an automotive vehicle comprising the steps of:
   providing pressurized air from a pressurized air source;
   opening a manifold pressurization valve coupled to the pressurized air source;
   pressurizing a manifold block with the pressurized air from the pressurized air source through the manifold pressurization valve;
   equalizing a high pressure differential across a plurality of suspension valves in the manifold block;
   opening the plurality of suspension valves and immediately closing the manifold pressurization valve; and
   exhausting air through the plurality of suspension valves from a plurality of air springs coupled to the plurality of suspension valves.

16. The method of as set forth in claim 15, wherein the step of opening a manifold pressurization valve coupled to the pressurized air source includes providing the pressurized air from the pressurized air source through the manifold pressurization valve to boost inlet port of a compressor.

17. The method of as set forth in claim 15, further including the steps of:
   opening a boost valve coupled to the pressurized air source; and
   providing the pressurized air from the pressurized air source through the boost valve to a boost inlet port of a compressor.

18. The method as set forth in claim 15, further including the steps of equalizing a high pressure differential across a reservoir valve coupled to the air source and to the manifold pressurization valve using the pressurized air and opening the reservoir valve and wherein the step of pressurizing a manifold block with the pressurized air from the air source through the manifold pressurization valve is further defined as pressurizing a manifold block with the pressurized air from the air source through the manifold pressurization valve and the reservoir valve.

19. The method as set forth in claim 15, wherein the step of opening the plurality of suspension valves and immediately closing the manifold pressurization valve is further defined as opening the plurality of suspension valves and simultaneously closing the manifold pressurization valve and a reservoir valve then followed by opening an exhaust valve coupled to the plurality of suspension valves and wherein the step of exhausting air through the plurality of suspension valves from a plurality of air springs coupled to the plurality of suspension valves is further defined as exhausting air through the plurality of suspension valves and the exhaust valve from a plurality of air springs coupled to the plurality of suspension valves.

20. A method of operating an air management system to control an air suspension assembly of an automotive vehicle comprising the steps of:
   providing pressurized air from a pressurized air source;
   opening a boost valve coupled to the pressurized air source;
   controlling a flow of the pressurized air from the pressurized air source with a boost flow orifice in-line with the boost valve;
   pressurizing a boost inlet port of a compressor using the pressurized air from the pressurized air source;
   controlling a plurality of control valves of the compressor to permit flow from the boost inlet port of the compressor to a manifold block;
   opening a plurality of suspension valves; and
   filling a plurality of air springs coupled to the plurality of suspension valves at a controlled rate using the pressurized air from the pressurized air source.

* * * * *